(12) United States Patent
Kishi et al.

(10) Patent No.: US 7,303,718 B2
(45) Date of Patent: Dec. 4, 2007

(54) INJECTION MOLDING APPARATUS AND INJECTION MOLDING METHOD

(75) Inventors: Shinsuke Kishi, Saitama (JP); Osamu Matsuura, Shizuoka (JP)

(73) Assignee: Sony Disc & Digital Solutions Inc., Tokyo (JP)

( * ) Notice: Subject to any disclaimer, the term of this patent is extended or adjusted under 35 U.S.C. 154(b) by 275 days.

(21) Appl. No.: 10/485,387

(22) PCT Filed: Jun. 6, 2003

(86) PCT No.: PCT/JP03/07192

§ 371 (c)(1),
(2), (4) Date: Jan. 30, 2004

(87) PCT Pub. No.: WO03/106135

PCT Pub. Date: Dec. 24, 2003

(65) Prior Publication Data

US 2004/0183231 A1    Sep. 23, 2004

(30) Foreign Application Priority Data

Jun. 13, 2002    (JP)    ............................. 2002-172619

(51) Int. Cl.
*B29C 45/20*    (2006.01)
(52) U.S. Cl. .................... 264/328.1; 425/568; 425/569
(58) Field of Classification Search ............. 264/328.1; 425/568, 569
See application file for complete search history.

(56) References Cited

U.S. PATENT DOCUMENTS 2,928,125 A  *  3/1960  Smucker et al. ............... 264/39

FOREIGN PATENT DOCUMENTS

| JP | 54-116565   | 8/1979 |
|----|-------------|--------|
| JP | 3-16217     | 2/1991 |
| JP | 6-198680    | 7/1994 |
| JP | 11-48286    | 2/1999 |
| JP | 2000-117776 | 4/2000 |

OTHER PUBLICATIONS

Translation—JP 11-048286 (Machine).*
International Search Report dated Feb. 9, 2003.
Japanese Office Action; Application No. 2002-172619; Dated: Feb. 6, 2007.

* cited by examiner

*Primary Examiner*—Monica A Huson
(74) *Attorney, Agent, or Firm*—Rader Fishman & Grauer; Ronald P. Kananen

(57) ABSTRACT

A space 12 is formed at a tip portion of a nozzle 1 so as to decrease a thermal transfer of the nozzle 1. Alternatively, a center portion of one of a semi-spherically protruded surface of the tip portion of the nozzle 1 and a semi-spherically recessed surface of a sprue bush protrudes so that the radius of curvature of one semi-spherical surface is the same as the radius of curvature of the other semi-spherical surface. As a result, since the nozzle 1 and the sprue bush 2 are surface-contacted, heat of the tip portion of the nozzle 1 absorbed to the sprue bush 2 is increased. Thus, the temperature of the tip portion of the nozzle 1 can be lowered easily. After the resin material injected into the molding cavity 11 is cooled, when the sprue portion is removed from the fixed die, a tip portion of a rod-shaped protrusion portion of the sprue can be properly cut.

4 Claims, 3 Drawing Sheets

INJECTION MOLDING APPARATUS AND INJECTION MOLDING METHOD

BACKGROUND OF THE INVENTION

1. Technical Field

The present invention relates to an injection molding apparatus and an injection molding method, in particular, to those suitable for producing a disc substrate.

2. Background Art

As a conventional molding method for optical discs, such as compact discs (CDs) and digital versatile discs (DVDs), the injection molding method has been used. In the injection molding method, with a pair of a fixed die and a movable die, a space is formed. The space is called a cavity. Molten resin material is injected in the cavity by an injection nozzle through a sprue bush. Therefore, the injected resin is cooled and solidified in the dies. As a result, a disc substrate is molded.

FIG. 1 is an outlined sectional view showing an example of a tip portion of an injection nozzle of conventional dies and a peripheral portion thereof. A nozzle 101 has a cylindrical shape. A tip portion of the nozzle 101 has a semi-spherically protruded surface. An internal space 103 of the nozzle 101 and the outside of the nozzle 101 are connected through a resin injection hole 104 at the tip portion of the nozzle 101. Another tip portion, not shown, of the nozzle 101 is, for example, thread-connected to a cylinder, not shown. In the cylinder, a heater that melts the resin material, a screw that pushes the molten resin material out of the cylinder to the internal space 103, and so forth are disposed. In such a structure, the molten resin material can be injected out of the resin injection hole 104 to the outside of the nozzle 101.

The die side in which the resin material is injected comprises a fixed die 107 and a movable die 108. When the fixed die 107 and the movable die 108 are set, a cavity 109 is formed. A sprue bush 102 is engaged with the cavity 109 of the fixed die 107 so that the sprue bush 102 is positioned perpendicular to a main plane that forms the cavity 109 of the fixed die 107. The sprue bush 102 is formed in a cylindrical shape and has an axial resin flow path 105. The resin flow path 105 allows the molten resin material supplied from the nozzle 101 to flow in the cavity 109.

The sprue bush 102 has a portion that contacts the tip of the nozzle 101. The portion is formed in a semi-spherically recessed shape. The radius of curvature is larger than the radius of curvature of the semi-spherically protruded surface of the tip of the nozzle 101. The difference of the radius of curvature of the semi-spherically recessed surface of the sprue bush 102 and the radius of curvature of the semi-spherically protruded shape of the nozzle 101 helps to press-contact the nozzle 101 and the sprue bush 102 without a space and to align easily the resin injection hole 104 and the resin flow path 105.

In addition, the sprue bush 102 has an inner ring-shaped coolant flow path 106 around the resin flow path 105. The coolant flow path 106 allows coolant supplied from the outside to flow so as to cool the sprue bush 102. In reality, cooling water that flows in the coolant flow path 106 allows the temperature of the sprue bush 102 to lower and thereby solidify the molten resin. The fixed die 107 and the movable die 108 have respective cooling units, not shown, along with the coolant flow path 106.

Next, with reference to FIG. 1, a molding method for a disc substrate by a conventional injection molding apparatus will be described. As shown in FIG. 1, the nozzle 101 is press-contacted to the sprue bush 102. The movable die 108 and the fixed die 107 are set. As a result, the cavity 109 is formed. In this state, the molten resin material for one shot is pushed from the supply side of the resin material, namely the cylinder side, not shown, toward the tip portion of the nozzle 101. Thus, the molten resin material is injected into the cavity 109 through the resin flow path 105 of the sprue bush 102.

Thereafter, both the fixed die 107 and the movable die 108 are cooled. In addition, the coolant that flows in the coolant flow path 106 cools the molten resin material. Thereafter, an ejector pin, not shown, separates a sprue portion from the resin material in the cavity 109. As a result, a disc substrate shaped by the cavity 109 is molded. The sprue portion is the resin material at a center hole portion formed at a center portion of the disc substrate. The resin flow path 105 causes resin material at the center hole portion to form a rod-shaped protrusion portion, so-called sprue, at the center portion.

After the resin material has been solidified, the movable die 108 is separated from the fixed die 107 and the molded disc substrate and sprue portion are removed from the fixed die by a removing unit. As a result, the disc substrate is molded by the injection molding apparatus.

However, when the foregoing injection molding apparatus molds a disc substrate, the following problem arises. In other words, when the sprue portion is removed from the fixed die by the removing unit, thread-shaped resin, so-called stringiness, may take place at a tip of the rod-shaped sprue protrusion portion. It is taught that stringiness occurs because the temperature of the resin material in the tip portion of the nozzle 101 does not sufficiently lower. Thus, to shorten the molding time for a disc substrate, in particular, if the cooling time for which the molten resin material is solidified is shortened, stringiness unavoidably occurs.

If the stringiness takes palace, string-shaped resin that was cut in this shot is molded in the next shot. As a result, since a string-shaped stripe would remain in the appearance of the molded product, it is treated as a defective product. In addition, the string-shaped resin would get caught in the removing unit. As a result, a sprue removing defect would take place.

To prevent stringiness from occurring, the setting temperatures of the nozzle 101 and the sprue bush 102 would be remarkably decreased. In this case, since the flow resistance of the resin material increases, the molding condition of the disc substrate would deteriorate. As a result, a good molded product would not be obtained.

Therefore, an object of the present invention is to provide an injection molding apparatus and an injection molding method that allow the temperature of a nozzle tip to lower so as to prevent stringiness from occurring and a good product, for example, a disc substrate, to be molded.

SUMMARY OF THE INVENTION

To accomplish the foregoing object, the present invention is an injection molding apparatus having a pair of dies, a bush, and a nozzle, the bush having a receiving portion formed in a semi-spherically recessed surface, the bush having an inner resin flow path through which resin is supplied to a cavity formed by the pair of dies, the nozzle having a tip portion formed as a semi-spherically protruded surface, the semi-spherically protruded surface of the tip portion of the nozzle being press-contacted to the semi-spherically recessed surface of the receiving portion of the bush, molten resin being injected into the cavity through the nozzle and the bush, wherein the tip portion of the nozzle is configured to hardly transfer heat.

In addition, the present invention is an injection molding apparatus having a pair of dies, a bush, and a nozzle, the bush having a receiving portion formed in a semi-spherically recessed surface, the bush having an inner resin flow path through which resin is supplied to a cavity formed by the pair of dies, the nozzle having a tip portion formed as a semi-spherically protruded surface, the semi-spherically protruded surface of the tip portion of the nozzle being press-contacted to the semi-spherically recessed surface of the receiving portion of the bush, molten resin being injected into the cavity through the nozzle and the bush, wherein a center portion of the semi-spherically recessed surface of the receiving portion of the bush protrudes as a protrusion portion, and wherein the protrusion portion is formed in a semi-spherically recessed surface whose radius of curvature is the same as the radius of curvature of the semi-spherically protruded surface of the tip portion of the nozzle.

In addition, the present invention is an injection molding apparatus having a pair of dies, a bush, and a nozzle, the bush having a receiving portion formed in a semi-spherically recessed surface, the bush having an inner resin flow path through which resin is supplied to a cavity formed by the pair of dies, the nozzle having a tip portion formed as a semi-spherically protruded surface, the semi-spherically protruded surface of the tip portion of the nozzle being press-contacted to the semi-spherically recessed surface of the receiving portion of the bush, molten resin being injected into the cavity through the nozzle and the bush, wherein a center portion of the semi-spherically protruded surface of the tip portion of the nozzle protrudes as a protrusion portion, and wherein the protrusion portion is formed in a semi-spherically protruded surface whose radius of curvature is the same as the radius of curvature of the semi-spherically recessed surface of the receiving portion of the bush.

According to the present invention, a nozzle having a tip portion that hardly transfers heat, and a bush having a bush receiving portion having a semi-spherically recessed surface whose center portion protrudes, the radius of curvature of the protruded center portion being the same as the radius of curvature of a semi-spherically protruded surface of the tip portion of the nozzle, or a nozzle having a tip portion whose center portion has a semi-spherically protruded surface and protrudes, the radius of curvature of the protruded portion being the same as the radius of curvature of the semi-spherically recessed surface of the bush receiving portion is used. Thus, the temperature of the tip portion of the nozzle can be easily lowered. As a result, the sprue can be properly cut.

DETAILED DESCRIPTION OF THE INVENTION

Figure 1:
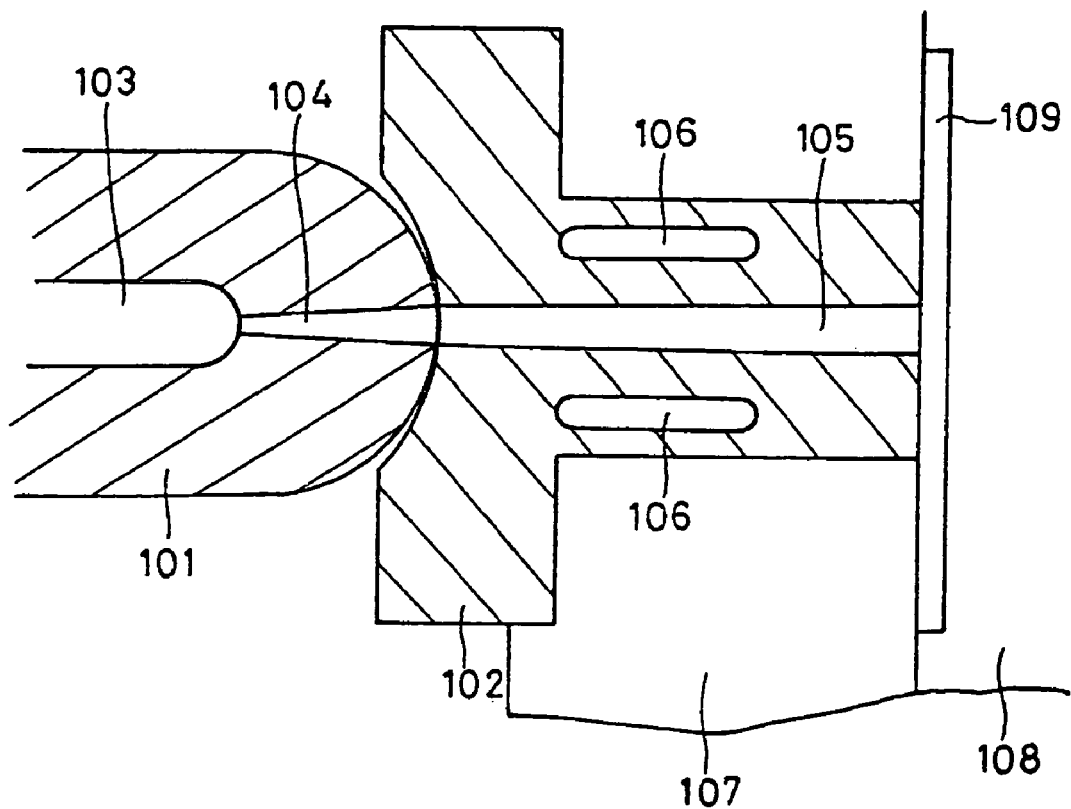
FIG. 1 is an outlined sectional view showing a tip portion of a conventional injection nozzle tip portion and dies disposed adjacent thereto.
Figure 2:
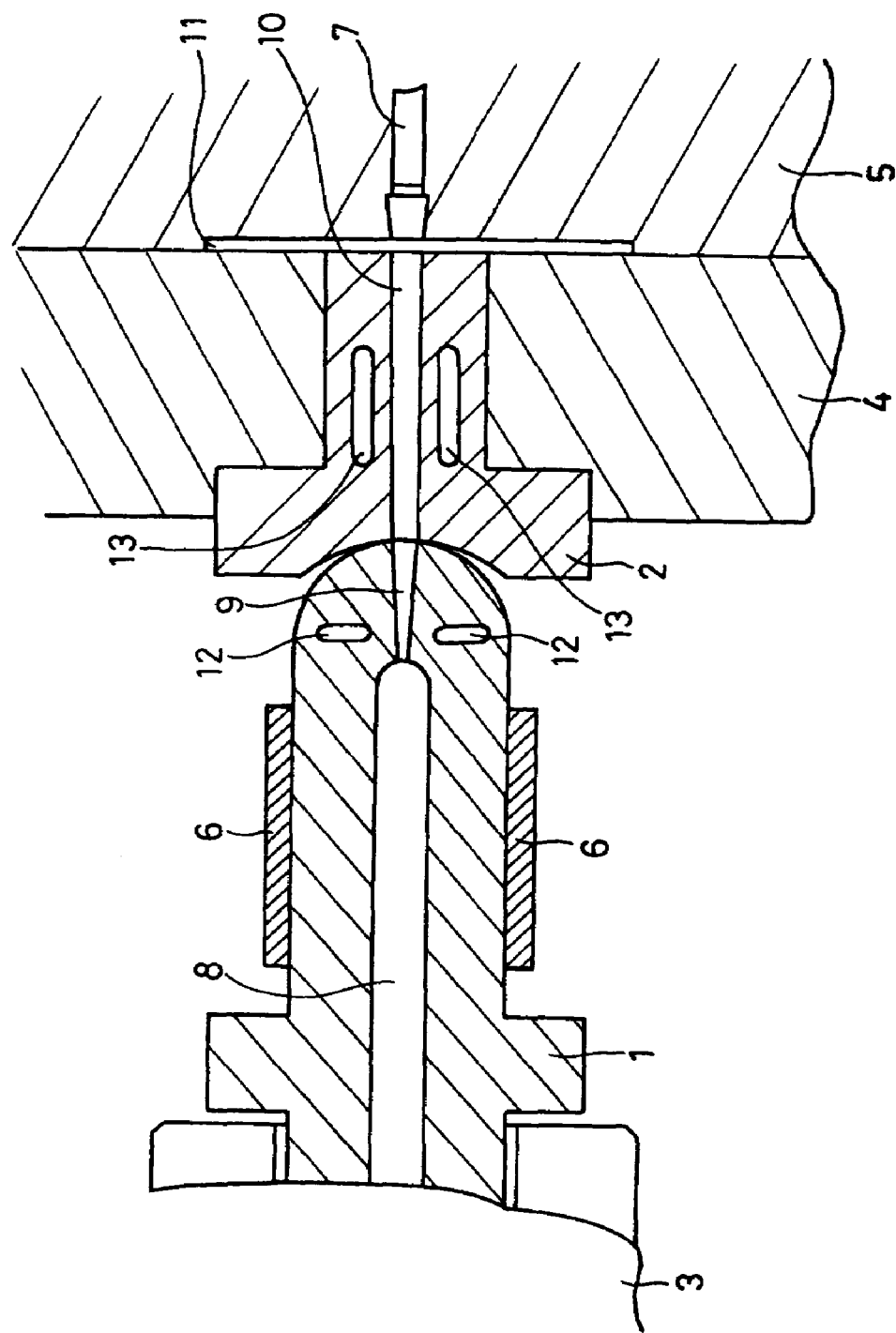
FIG. 2 is an outlined sectional view showing an example of an injection molding apparatus according to a first embodiment of the present invention.

Next, with reference to the accompanying drawings, embodiments of the present invention will be described. First of all, an injection molding apparatus according to the first embodiment of the present invention will be described. FIG. 2 is an outlined sectional view showing an example of the injection molding apparatus according to the first embodiment of the present invention. The injection molding apparatus shown in FIG. 2 comprises a nozzle 1, a sprue bush 2, a fixed die 4, and a movable die 5. Portions that are not shown in FIG. 2 are the same as those of the conventional injection molding apparatus.

The nozzle 1 has a cylindrical shape. A tip portion of the nozzle 1 has a semi-spherically protruded shape. The tip portion of the nozzle 1 contacts a sprue bush 2. An internal space 8 of the nozzle 101 and the outside of the nozzle 1 are connected through a resin injection hole 9 at the tip portion of the nozzle 1. Another tip portion of the nozzle 1, not shown, is, for example, thread-connected to a cylinder 3. In the cylinder 3, a heater that melts the resin material, a screw that pushes the resin material out of the cylinder 3 to the internal space 8 of the nozzle 1, and so forth are disposed. In such a structure, molten resin material can be injected from the resin injection hole 8 to the outside of the nozzle 1.

A heater 6 is disposed on an outer peripheral portion of the cylindrical nozzle 1. The heater 6 keeps the molten resin material supplied from the cylinder 3 at a predetermined temperature. As a result, the resin material to be injected from the tip portion of the nozzle 1 can be kept at a temperature suitable for molding the disc substrate.

The nozzle 1 has a ring-shaped space 12 in front of the heater 6 at a position that the space 12 does not affect the structure of the inner space 8 of the resin injection hole 9 and so forth and the contact state to the sprue bush 2 and the injection of the resin material. The space 12 is a cavity formed at the tip portion of the nozzle 1 made of a metal such as SUS 440C. The cavity is formed at the tip portion of the nozzle 1 in front of the heater 6, in reality, at the tip of the nozzle 1 made of a metal around the resin injection hole 9, so that the nozzle 1 suppresses heat transferred from the heater 6 to the tip portion of the nozzle 1.

A die side into which the resin material is injected mainly comprises the fixed die 4 and the movable die 5. When the fixed die 4 and the movable die 5 are set, a cavity 11 is formed. When, for example, a disc substrate of an optical disc is molded, a stamper that forms a finely uneven portion, such as pits, for which a signal is reproduced and lands and grooves for which an information signal is recorded is used. With the stamper, a signal plane to/from which a signal is recorded or/and reproduced is formed.

In addition, the sprue bush 2 is engaged with the cavity 11 of the fixed die 4 so that the sprue bush 2 is position perpendicular to a main plane that forms the cavity 11 of the fixed die 4. The sprue bush 2 is formed in a cylindrical shape and axially has a resin flow path 10. The resin flow path 10 allows the molten resin material supplied from the nozzle 1 to flow in the cavity 11.

A receiving portion of the sprue bush 2, namely a portion that contacts the tip of the nozzle 1, is formed in a semi-spherically recessed shape. The radius of curvature of the inner-spherical portion contacted to the tip of the nozzle 1 is larger than the radius of curvature of a semi-spherically protruded portion at the tip of the nozzle 1. The difference of the radius of curvature of the semi-spherically recessed shape of the sprue bush 2 and the radius of curvature of the semi-spherically protruded shape of the nozzle 1 helps to contact the nozzle 1 and the sprue bush 2 without a space and to align easily the resin injection hole 9 and the resin flow path 10.

In addition, the sprue bush 2 has an inner ring-shaped coolant flow path 13 around the resin flow path 10. The coolant flow path 13 allows coolant to cool the sprue bush 2. In reality, cooling water that flows in the coolant flow path 13 allows the temperature of the sprue bush 2 to lower and thereby solidify the molten resin. The fixed die 4 and the movable die 5 have respective cooling units, not shown, along with the coolant flow path 13.

An ejector pin 7 perpendicularly pierces the main plane of the cavity 11 from the movable die 5 side to the direction of the sprue bush 2. The ejector pin 7 separates the sprue portion from the disc substrate formed in the cavity 11.

Next, a molding method for a disc substrate by the injection molding apparatus according to the first embodiment will be described. As shown in FIG. 2, the nozzle 1 is press-contacted to the sprue bush 2. The fixed die 4 and the movable die 5 are set. As a result, the cavity 11 is formed. In this state, the molten resin material for one shot is pushed from the cylinder 3 side toward the tip portion of the nozzle 1. Thus, the molten resin material is injected from the resin injection hole 9 into the cavity 11 through the resin flow path 10 of the sprue bush 2.

Thereafter, the resin material injected into the dies is cooled. At that point, since there is the space 12 at the tip portion of the nozzle 1, a transfer of heat from the heater 6 is suppressed. Thus, the cooling time at the tip portion of the nozzle 1 can be shortened.

The ejector pin 7 separates the sprue portion from the resin material in the cavity 11. A molded disc substrate is formed in the cavity 11. The sprue portion is the resin material in the center hole portion formed at the center portion of the molded disc substrate. The resin material in the center hole portion protrudes at the center as a rod-shaped protrusion portion, so-called sprue, formed by the resin in the resin flow path 10.

After the resin material has been solidified, the movable die 5 is removed from the fixed die 4. The molded disc substrate and the sprue portion are removed from the dies by the removing unit. As a result, the disc substrate has been molded by the injection molding apparatus according to the first embodiment.

As described above, according to the first embodiment, since the space 12 is formed at the tip portion of the nozzle 1, heat of the heater 6 is hardly transferred to the tip portion of the nozzle 1. Thus, the temperature at the tip portion of the nozzle 1 lowers. As a result, after the molten resin has been cooled, when the sprue portion is removed from the fixed die, the tip of the rod-shaped protrusion portion of the sprue portion can be properly cut at the tip portion of the nozzle 1. Thus, when the cooling time for which the molten material is solidified is shortened and thereby the molding time for the disc substrate is shortened, stringiness hardly occurs.

Thus, the molded product defect due to the stringiness and the sprue removing defect due to the removing unit can be prevented.

Figure 3:
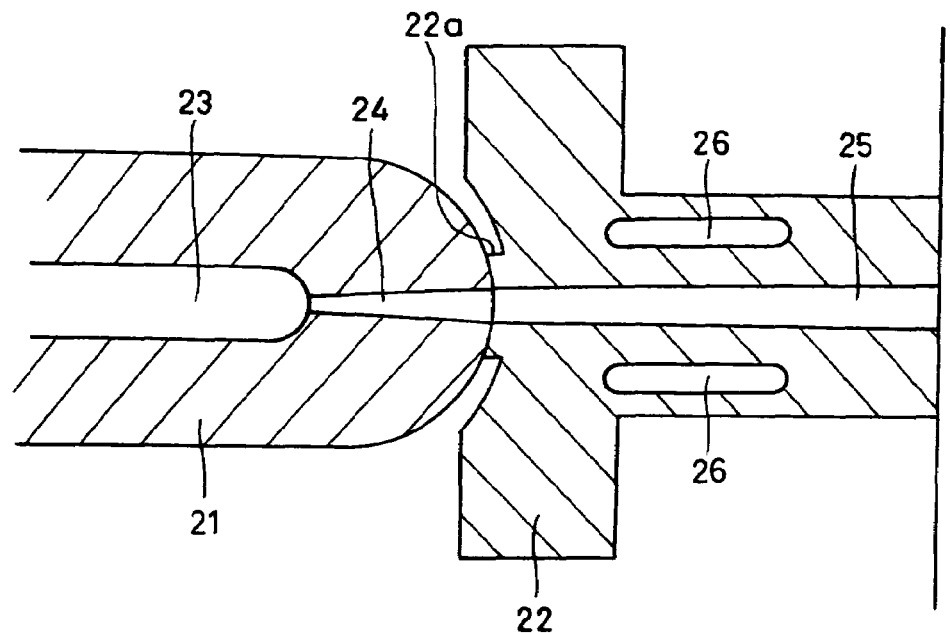
FIG. 3 is an outlined sectional view showing an example of an injection molding apparatus according to a second embodiment of the present invention.
Figure 4:
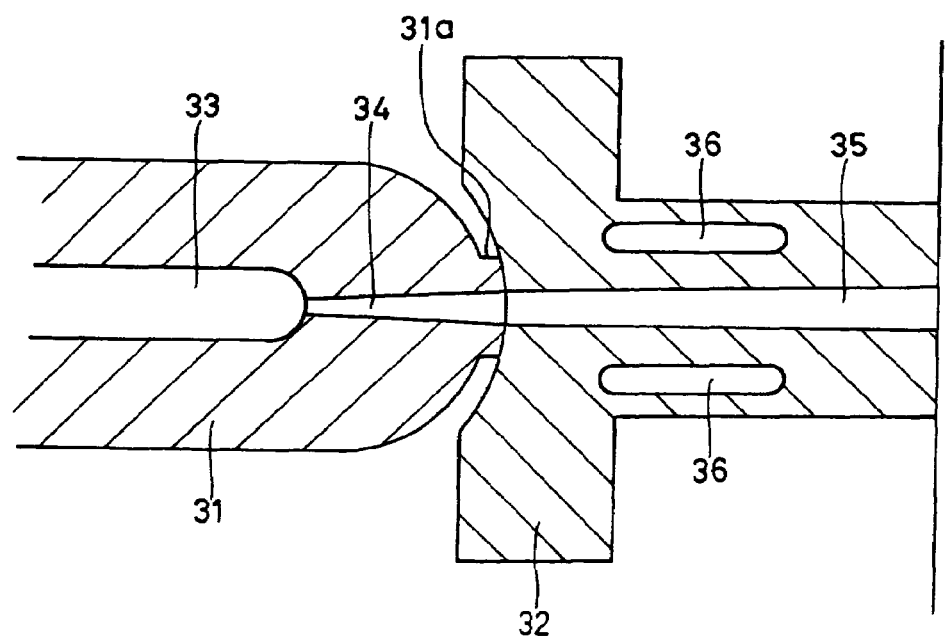
FIG. 4 is an outlined sectional view showing an example of an injection molding apparatus according to a third embodiment of the present invention.

Next, an injection molding apparatus according to a second embodiment of the present invention will be described. FIG. 3 is an outlined sectional view showing an example of the injection molding apparatus according to the second embodiment of the present invention. FIG. 4 is an enlarged view showing a contact portion of an injection nozzle and a sprue bush according to a third embodiment of the present invention. Portions not shown in FIG. 3 and FIG. 4 have the same structure and operation as those according to the first embodiment. Their description will be omitted.

A nozzle 21 has a cylindrical shape. A tip portion of the nozzle 21 is formed in a semi-spherically protruded shape. The tip portion contacts a sprue bush 22. An inner space 23 of the nozzle 21 and the outside of the nozzle 21 are connected through a resin injection hole 24 at the tip portion of the nozzle 21. The other tip portion, not shown, of the nozzle 21 is thread-connected to a cylinder.

The sprue bush 22 on the die side is formed in a cylindrical shape. The sprue bush 22 has an axial resin flow path 25. The resin flow path 25 allows the molten resin material supplied from the nozzle 21 to flow in the inner space of the cavity.

The sprue bush 22 has a semi-spherically recessed surface. A semi-spherically recessed surface protrusion portion 22a is formed on the semi-spherically recessed surface. The semi-spherically recessed surface protrusion portion 22a contacts the semi-spherically protruded surface of the tip portion of the nozzle 21. The semi-spherically recessed surface protrusion portion 22a is a protrusion portion that protrudes in the direction of the nozzle 21 and that is formed in the sprue bush 22 so that the resin flow path 25 surface-contacts the periphery of the hole end of the resin injection hole 24. Thus, the radius of curvature of the semi-spherically recessed portion of the semi-spherically recessed surface protrusion portion 22a that contacts the nozzle 21 is the same as the radius of curvature of the semi-spherically protruded surface at the tip of the nozzle 21. The resin flow path 25 is surface-contacted to only the periphery of the opening of the resin injection hole 24. Thus, while the nozzle 21 is properly press-contacted to the sprue bush 22, thermal conductivity therebetween improves.

In addition, the sprue bush 22 has an inner coolant flow path 26 around the resin flow path 25. The coolant flow path 26 allows coolant to cool the sprue bush 22. In reality, cooling water that flows in the coolant flow path 26 allows the temperature of the sprue bush 22 to lower and thereby solidify the molten resin.

Next, a molding method for a disc substrate by the injection molding apparatus according to the second embodiment will be described. As shown in FIG. 3, the nozzle 21 is press-contacted to the sprue bush 22. With dies, not shown, a cavity is formed. In this state, molten resin material for one shot is pushed from a cylinder, not shown, toward the tip portion of the nozzle 21. Thus, the molten resin material is injected from the resin injection hole 24 into the cavity through the resin flow path 25 of the sprue bush 22.

Thereafter, the dies are cooled. In addition, coolant that flows in the coolant flow path 26 cools the molten resin material. As a result, the molten resin material is cooled. At that time, since the tip portion of the nozzle 21 is surface-contacted to the sprue bush 22, heat from the tip portion of the nozzle 21 is absorbed by the sprue bush 22 side. Thus, the cooling time for the tip portion of the nozzle 21 is shortened.

Thereafter, the sprue portion described in the first embodiment is separated from the resin material in the cavity. As a result, a disc substrate formed by the cavity is molded.

After the resin material has been solidified, the molded disc substrate and sprue portion are removed from the fixed die by the removing unit. As a result, the disc substrate is molded by the injection molding apparatus according to the second embodiment.

As described above, according to the second embodiment, since the semi-spherically recessed surface protrusion portion 22a is formed on the sprue bush 22, the tip portion of the nozzle 21 is surface-contacted to the sprue bush 22. Thus, heat of the tip portion of the nozzle 21 is absorbed by the sprue bush 22. As a result, the temperature of the tip portion of the nozzle 21 lowers. After the molten resin has been cooled, when the sprue portion is removed from the dies, the tip portion of the rod-shaped protrusion portion of the sprue portion can be properly cut at the tip portion of the nozzle 21. When the cooling time for which the molten material is solidified is shortened and thereby the molding time for the disc substrate is shortened, stringiness hardly occurs.

Thus, the molded product defect due to stringiness and the sprue removing defect due to the removing unit can be prevented.

Next, an injection molding apparatus according to a third embodiment of the present invention will be described. FIG. 4 is an outlined sectional view showing an example of the injection molding apparatus according to the third embodiment of the present invention. According to the third embodiment, a protrusion portion is formed on a nozzle side, unlike the foregoing second embodiment.

A nozzle 31 has a tip portion having a semi-spherically protruded surface. A semi-spherically protruded surface protrusion portion 31a is formed at the tip portion of the nozzle 31. The semi-spherically protruded surface protrusion portion 31a is surface-contacted to a semi-spherically recessed surface of a sprue bush 32. The semi-spherically protruded surface protrusion portion 31a is a protrusion portion that protrudes in the direction of the sprue bush 32 formed at the tip of the nozzle 31 so that a resin injection hole 34 is surface-contacted to the periphery of a hole end of a resin flow path 35. Thus, the radius of curvature of the semi-spherically protruded surface contacted to the sprue bush 32 of the semi-spherically protruded surface protrusion portion 31a is the same as the radius of curvature of the semi-spherically recessed surface of the sprue bush 32. Since the resin injection hole 34 formed in the nozzle 31 is surface-contacted to only the periphery of the opening of the resin flow path 35 formed in the sprue bush 32, while the nozzle 31 and the sprue bush 32 are properly press-contacted, their thermal conductivity improves.

This structure other than the position of the protrusion portion of the third embodiment is the same as the structure of the foregoing second embodiment. In other words, an inner space 33 of the nozzle 31 and the outside of the nozzle 31 are connected by the resin injection hole 34. In addition, the other side of the nozzle 31, not shown, is thread-connected to the cylinder. Moreover, the sprue bush 32 has an inner ring-shaped coolant flow path 36 around the resin flow path 35.

Next, a molding method for a disc substrate by the injection molding apparatus according to the third embodiment will be described. First of all, molten resin material for one shot is pushed from a cylinder, not shown, to a tip portion of the nozzle 31. Thus, the molten resin material is injected from the resin injection hole 34 into the inside of the cavity through the resin flow path 35 of the sprue bush 32.

Thereafter, the dies are cooled. In addition, coolant that flows in the coolant flow path 36 cools the molten resin material. At that point, since the tip portion of the nozzle 31 is surface-contacted to the sprue bush 32, heat of the tip portion of the nozzle 31 is absorbed by the sprue bush 32 side. Thus, the cooling time of the tip portion of the nozzle 31 is shortened. Thereafter, the sprue portion is separated from the resin material in the cavity. As a result, a disc substrate formed by the cavity is molded.

After the resin material has been solidified, the molded disc substrate and the sprue portion are removed from the fixed die by the removing unit. As a result, the disc substrate has been molded by the injection molding apparatus according to the third embodiment.

As described above, according to the third embodiment, with the semi-spherically protruded portion 31a formed on the nozzle 31, the tip portion of the nozzle 31 is surface-contacted to the sprue bush 32. Thus, heat of the tip portion of the nozzle 31 is absorbed by the sprue bush 32. Consequently, the temperature of the tip portion of the nozzle 31 lowers. After the molten resin has been cooled, when the sprue portion is removed, the tip portion of the rod-shaped protrusion portion of the sprue portion can be properly cut at the tip portion of the nozzle 21. In particular, when the cooling time for which the molten material is solidified and thereby the molding time for the disc substrate is shortened, stringiness hardly occurs.

Thus, the molded product defect due to stringiness and the sprue removing defect due to the removing unit can be prevented.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the first embodiment, the space 12 is structured as a ring-shaped cavity. However, the present invention is not limited to that. In other words, as long as a transfer of heat of the metal of the tip portion of the nozzle 1 is suppressed, another structure may be used. For example, the semi-peripherally recessed portion may be grooved from the outside. Alternatively, a plurality of holes may be formed by a drill or the like.

According to the first embodiment, the shape of the tip portion of the nozzle 1 is changed so as to decrease a heat transfer of the tip portion. When the material of the tip portion of the nozzle 1 is changed from SUS 440C, which is ordinarily used and whose thermal conductivity is in the range from 0.04 to 0.05 cal/cm·sec·°C., to a material that has a higher thermal conductivity than that, the thermal transfer of the tip portion of the nozzle 1 can be decreased.

Alternatively, a combination of the structure of the first embodiment and the structure of the second embodiment may be used. In addition, a combination of the structure of the first embodiment and the structure of the third embodiment may be used.

As described above, according to the present invention, the thermal conductivity of the tip portion of the nozzle of the injection molding apparatus is decreased. Alternatively, heat absorption of the tip portion of the nozzle by the sprue bush is increased. Consequently, the temperature of the tip of the nozzle is lowered. Thus, the stringiness that occurs when the sprue is removed from the dies can be prevented. As a result, a good molded product can be obtained. In addition, the molding time for a molded product can be shortened.

The invention claimed is:

1. An injection molding apparatus having a pair of dies, a bush, and a nozzle, the bush having a receiving portion formed in a semi-spherically recessed surface, the bush having an inner resin flow path through which resin is supplied to a cavity formed by the pair of dies, the nozzle having a tip portion formed as a semi-spherically protruded surface, the semi-spherically protruded surface of the tip portion of the nozzle including a resin injection hole and being press-contacted to the semi-spherically recessed surface of the receiving portion of the bush, molten resin being injected into the cavity through the nozzle and the bush, wherein a center portion of the semi-spherically recessed surface of the receiving portion of the bush protrudes in a direction towards the nozzle as a protrusion portion, and wherein the protrusion portion includes a semi-spherically recessed surface whose radius of curvature is the same as the radius of curvature of the semi-spherically protruded surface of the tip portion of the nozzle so that the inner resin flow path surface-contacts to only the periphery of the hole end of the resin injection hole.

2. An injection molding method for molding a molded product, comprising the steps of:

press-contacting a semi-spherically recessed surface of a receiving portion of a bush to a semi-spherically protruded surface of a tip portion of a nozzle, the semi-spherically protruded surface including a resin injection hole, a resin flow path being formed in a cavity formed by a pair of dies, resin being supplied to the cavity through the resin flow path; and injecting molten resin into the cavity through the nozzle and the bush, wherein a center portion of the semi-spherically recessed surface of the receiving portion of the bush protrudes in a direction towards the nozzle as a protrusion portion, and wherein the protrusion portion includes a semi-spherically recessed surface whose radius of curvature is the same as the radius of curvature of the semi-spherically protruded surface of the tip portion of the nozzle so that the inner resin flow path surface-contacts to only the periphery of the hole end of the resin injection hole.

3. An injection molding apparatus having a pair of dies, a bush, and a nozzle, the bush having a receiving portion formed in a semi-spherically recessed surface, the bush having an inner resin flow path through which resin is supplied to a cavity formed by the pair of dies, the nozzle having a tip portion formed as a semi-spherically protruded surface, the semi-spherically protruded surface of the tip portion of the nozzle including a resin injection hole and being press-contacted to the semi-spherically recessed surface of the receiving portion of the bush, molten resin being injected into the cavity through the nozzle and the bush, wherein a center portion of the semi-spherically protruded surface of the tip portion of the nozzle protrudes as a protrusion portion, and wherein the protrusion portion includes a semi-spherically protruded surface whose radius of curvature is the same as the radius of curvature of the semi-spherically recessed surface of the receiving portion of the bush so that the inner resin flow path surface-contacts to only the periphery of the hole end of the resin injection hole.

4. An injection molding method for molding a molded product, comprising the steps of:

press-contacting a semi-spherically recessed surface of a receiving portion of a bush to a semi-spherically protruded surface of a tip portion of a nozzle, the semi-spherically protruded surface including a resin injection hole, a resin flow path being formed in a cavity formed by a pair of dies, resin being supplied to the cavity through the resin flow path; and injecting molten resin into the cavity through the nozzle and the bush, wherein a center portion of the semi-spherically protruded surface of the tip portion of the nozzle protrudes as a protrusion portion, and wherein the protrusion portion includes a semi-spherically protruded surface whose radius of curvature is the same as the radius of curvature of the semi-spherically recessed surface of the receiving portion of the bush so that the inner resin flow path surface-contacts to only the periphery of the hole end of the resin injection hole.

* * * * *